United States Patent
Rakshit et al.

(10) Patent No.: US 11,120,599 B2
(45) Date of Patent: Sep. 14, 2021

(54) DERIVING AVATAR EXPRESSIONS IN VIRTUAL REALITY ENVIRONMENTS

(71) Applicant: International Business Machines Corporation, Armonk, NY (US)

(72) Inventors: Sarbajit K. Rakshit, Kolkata (IN); Martin G. Keen, Cary, NC (US); John M. Ganci, Jr., Raleigh, NC (US); James E. Bostick, Cedar Park, TX (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 21 days.

(21) Appl. No.: 16/184,633

(22) Filed: Nov. 8, 2018

(65) Prior Publication Data
US 2020/0151934 A1   May 14, 2020

(51) Int. Cl.
*G06T 13/40* (2011.01)
*G06K 9/00* (2006.01)

(52) U.S. Cl.
CPC ......... *G06T 13/40* (2013.01); *G06K 9/00315* (2013.01); *G06K 9/00496* (2013.01)

(58) Field of Classification Search
CPC . G06T 13/40; G06K 9/00315; G06K 9/00496
USPC ...................................................... 345/473
See application file for complete search history.

(56) References Cited

U.S. PATENT DOCUMENTS

| 6,244,987 B1 | 6/2001 | Ohsuga et al. |
| 6,425,764 B1 | 7/2002 | Lamson |
| 8,207,971 B1* | 6/2012 | Koperwas .............. G06T 13/40 345/473 |
| 10,133,918 B1* | 11/2018 | Chang ................. G06K 9/00308 |
| 2009/0195545 A1* | 8/2009 | Debevec ................. G06T 13/40 345/473 |
| 2009/0285456 A1* | 11/2009 | Moon .................. G06K 9/00335 382/118 |

(Continued)

OTHER PUBLICATIONS

D. Han, N. Al Jawad, and H. Du. Facial expression identication using 3d geometric features from microsoftkinect device. In SPIE Commercial+Scientic Sensing and Imaging, pp. 986903{986903.*

(Continued)

*Primary Examiner* — Jin Ge
(74) *Attorney, Agent, or Firm* — Garg Law Firm, PLLC; Rakesh Garg; Anthoney England

(57) ABSTRACT

A method, system, and computer program product for detecting, by measuring a signal indicative of a movement of a facial muscle, a motion pattern; deriving, from the motion pattern, a derived motion pattern, wherein the motion pattern and the derived motion pattern each corresponds to different emotional responses of a class of emotional responses; creating an emotional model for the class of emotional responses based on the motion pattern and the derived motion pattern; and reconfiguring the derived motion pattern to a new motion pattern by (i) comparing the new motion pattern and the derived motion pattern and (ii) associating, based on the comparison, the new motion pattern with the class of emotional responses, wherein the derived motion pattern and the new motion pattern fail to be detected via muscle movement prior to the motion pattern.

18 Claims, 5 Drawing Sheets

(56) References Cited

U.S. PATENT DOCUMENTS

| | | | |
|---|---|---|---|
| 2010/0211397 A1* | 8/2010 | Park | G10L 17/26 704/276 |
| 2010/0266213 A1* | 10/2010 | Hill | A61B 5/16 382/218 |
| 2012/0169895 A1* | 7/2012 | Wan | H04N 5/23219 348/222.1 |
| 2014/0172163 A1* | 6/2014 | Ahn | B25J 11/001 700/245 |
| 2014/0362091 A1* | 12/2014 | Bouaziz | G06T 15/503 345/473 |
| 2015/0084950 A1* | 3/2015 | Li | G06K 9/00214 345/419 |
| 2016/0077547 A1 | 5/2016 | Amone et al. | |
| 2016/0217322 A1* | 7/2016 | Kim | G06K 9/00308 |
| 2016/0328875 A1* | 11/2016 | Fang | G06T 5/002 |
| 2017/0069124 A1* | 3/2017 | Tong | G06F 16/5854 |
| 2017/0102766 A1 | 4/2017 | Hayashida | |
| 2018/0143429 A1 | 5/2018 | Gibbs et al. | |
| 2018/0178372 A1* | 6/2018 | Lee | B25J 9/0003 |
| 2018/0247443 A1* | 8/2018 | Briggs | G06K 9/00302 |
| 2019/0325633 A1* | 10/2019 | Miller, IV | G06K 9/00597 |
| 2020/0090392 A1* | 3/2020 | Chou | G06K 9/00281 |

OTHER PUBLICATIONS

H. Li, "Facial performance sensing head-mounted display." ACM Trans. Graph. 34, 4, Article 47 (Jul. 2015), 9 pages.

I. Mavridou, "FACETEQ interface demo for emotion expression in VR," 2017 IEEE Virtual Reality (VR), Los Angeles, CA, 2017, pp. 441-442.

* cited by examiner

DERIVING AVATAR EXPRESSIONS IN VIRTUAL REALITY ENVIRONMENTS

TECHNICAL FIELD

The present invention relates generally to a method, system, and computer program product for expressions in virtual reality. More particularly, the present invention relates to a method, system, and computer program product for deriving avatar expressions in virtual reality environments.

BACKGROUND

Computer-mediated reality (CMR) experiences enable users to participate in at least a partially simulated environment. Two common types of CMR are virtual reality and augmented reality. Virtual reality (VR) experiences enable users to participate in a simulated environment incorporating visual, auditory, and other forms of sensory feedback. Augmented reality (AR) experiences enable users to participate in a real-world environment incorporating computer-generated objects and information to provide visual, auditory, and other forms of sensory feedback. An ever increasing number of applications is available for computer-mediated reality equipment and computer-mediated reality devices (collectively and interchangeably, "CMR device" or "CMR devices"). CMR devices allow a user to interact with a CMR world created by an application by looking around, moving around, and interacting with virtual features or items in the CMR world.

CMR headsets are a category of CMR devices. A CMR headset is essentially a head-mounted display with a small screen in front of the eyes of the user. A user can wear such a device along with holding a controller in either one or both hands, the controller used to interact with objects in the CMR world.

Some CMR devices are independent CMR devices in that they can operate as stand-alone CMR devices. Such a CMR device either includes some or all the capabilities of a wireless data processing system, wireless data communication device, or wireless computing platform (collectively and interchangeably, "mobile device" or "mobile devices").

Other CMR devices are dependent CMR devices in that they operate in conjunction with a mobile device described above. Such a CMR device performs certain functions while in communication with a mobile device described above.

Electromyography (EMG) is a diagnostic and analysis technique for evaluating and recording electrical activity produced by muscle tissue. Muscle tissue at rest is normally electrically inactive. Electrical potentials appear when muscle tissue is contracted. Facial EMG can be used to analyze the activation of muscles located in the face.

SUMMARY

The illustrative embodiments provide a method, system, and computer program product for. An embodiment includes a method including detecting, by measuring a signal indicative of a movement of a facial muscle, a motion pattern.

An embodiment includes deriving, from the motion pattern, a derived motion pattern, wherein the motion pattern and the derived motion pattern each corresponds to different emotional responses of a class of emotional responses.

An embodiment includes creating an emotional model for the class of emotional responses based on the motion pattern and the derived motion pattern.

An embodiment includes reconfiguring the derived motion pattern to a new motion pattern by (i) comparing the new motion pattern and the derived motion pattern and (ii) associating, based on the comparison, the new motion pattern with the class of emotional responses, wherein the derived motion pattern and the new motion pattern fail to be detected via muscle movement prior to the motion pattern.

In an embodiment, the motion pattern comprises a series of motions. An embodiment includes detecting, by measuring a second signal indicative of a movement of a facial muscle, a second motion pattern.

An embodiment includes reconfiguring the new motion pattern to the second motion pattern by (i) comparing the new motion pattern and the second motion pattern and (ii) associating, based on the comparison, the second motion pattern with a same emotional response as the new motion pattern.

An embodiment includes provoking, prior to detecting the motion pattern, an emotional response from the class of emotional responses in a user. An embodiment includes associating, based on the detection, the motion pattern with the provoked emotional response.

An embodiment includes associating, based on the detection, the second motion pattern with one of the series of emotional responses. In an embodiment, the new motion pattern comprises a transition motion pattern between the motion pattern and the derived motion pattern. In an embodiment, the detecting is performed at an application executing using a processor and a memory in a wearable device.

An embodiment includes a computer usable program product. The computer usable program product includes one or more computer-readable storage devices, and program instructions stored on at least one of the one or more storage devices.

In an embodiment, the computer usable code is stored in a computer readable storage device in a data processing system, and wherein the computer usable code is transferred over a network from a remote data processing system.

In an embodiment, the computer usable code is stored in a computer readable storage device in a server data processing system, and wherein the computer usable code is downloaded over a network to a remote data processing system for use in a computer readable storage device associated with the remote data processing system.

BRIEF DESCRIPTION OF THE SEVERAL VIEWS OF THE DRAWINGS

The novel features believed characteristic of the invention are set forth in the appended claims. The invention itself, however, as well as a preferred mode of use, further objectives and advantages thereof, will best be understood by reference to the following detailed description of the illustrative embodiments when read in conjunction with the accompanying drawings, wherein:

DETAILED DESCRIPTION

Figure 1:
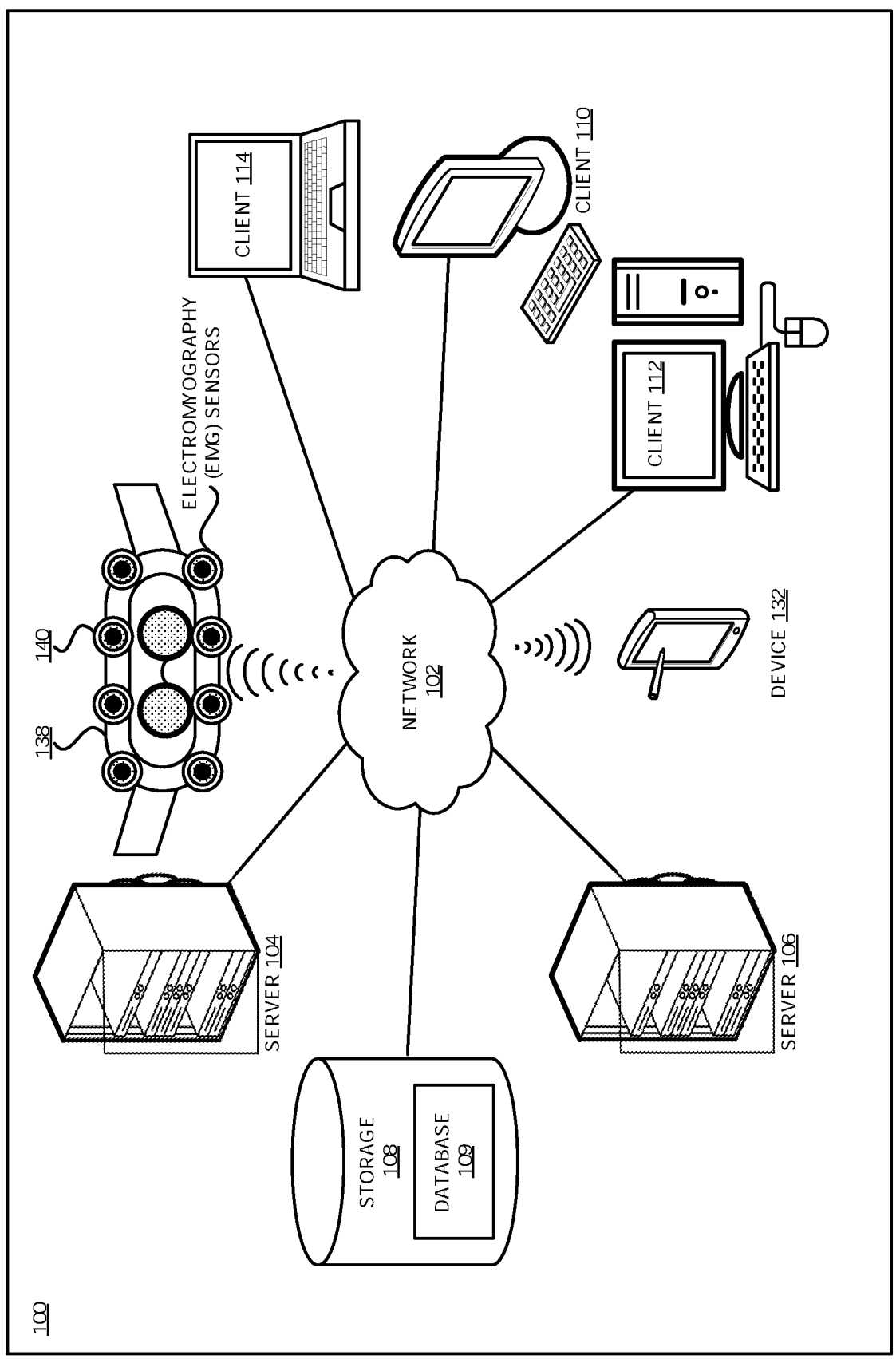
FIG. 1 depicts a block diagram of a network of data processing systems according to an illustrative embodiment.

In some cases, an operation described in an embodiment is implementable in a CMR device, a mobile device, or both. Additionally, in some cases, an operation described in an embodiment as an operation in a mobile CMR can be implemented as an operation in a mobile device, and vice-versa.

CMR experiences occur in a simulated environment. An avatar is a static or animated digital character model formed using a graphical image. The avatar represents a user in the simulated environment of a CMR experience, such as, a video game. CMR devices, such as CMR headsets, display and manipulate an avatar in the simulated environment. For example, a CMR headset can generate simulated environments, including images, sounds, and other sensations to simulate a user's physical presence in the simulated environment.

Electromyography (EMG) techniques evaluate and record electrical activity produced by skeletal muscles. EMG sensors detect signals in the form of the electric potential generated by muscles cells during electrical or neurological activation.

Motion capturing processes record the movement of objects or people to create animations. For example, an actor performs facial movements to simulate a desired emotional response. Animators then map the facial movements to a digital character model.

The illustrative embodiments recognize that animating cartoons and digital character models, such as avatars, is a complex and time-consuming task. The illustrative embodiments recognize that motion capturing processes require an actor to perform numerous emotional responses to be mapped to the digital character model. The illustrative embodiments further recognize that conventional drawing techniques require a skilled animator or automated system to manipulate facial movements of a digital character model to simulate desired emotional responses.

Within the scope of the illustrative embodiments, a motion is any motion that is detectable, including but not limited to, at a user's face or a part of the user's face or at a limb of the user. The illustrative embodiments recognize that emotional responses provoke a variety of motions in a user. Facial movements, auditory responses, and eye movements are some non-limiting examples of motions contemplated within the scope of the illustrative embodiments.

Presently, motion capture processes record the movement of objects or people to create animations. For example, an actor performs facial movements to simulate a desired emotional response. Skilled animators then map the facial movements to a digital character model. The illustrative embodiments recognize that such detecting of discrete facial movements requires an actor to perform each and every emotional response to be mapped to the digital character model. The illustrative embodiments further recognize that performing each emotional response is prohibitively costly and time-consuming.

Similarly, skilled animators use a digital toolkit to manipulate a digital character model. For example, a skilled animator interacts with a digital character model like a marionette with hundreds of virtual strings, each string controlling a separate facial feature. The illustrative embodiments recognize that such digital manipulation requires skilled animators with many hours of training.

A pattern of a motion (motion pattern) according to the illustrative embodiments comprises a series of motions. A motion pattern can be, but need not necessarily be, a discrete motion in a discrete time. In other words, a motion pattern can be one or more motions spanning a finite length of time. Furthermore, a motion pattern can comprise repetitive performance of one motion, performance of different motions, or a combination thereof.

Additionally, a motion pattern can be, but need not necessarily be continuous. In other words, a motion pattern according to the illustrative embodiments can include zero or more pauses or periods of no motions, i.e., periods where no motion is detected.

An emotional response according to the illustrative embodiments comprises a series of motions, generally occurring with facial muscles. An emotional response can include, but need not necessarily include, vocal response, movement at a user's limbs, and eye movement.

The illustrative embodiments used to describe the invention generally address and solve the above-described problems and other problems related to expressions in virtual reality environments. The illustrative embodiments provide a method, system, and computer program product for deriving avatar expressions for virtual reality environments.

An embodiment can be implemented in hardware or firmware in a CMR device, or in a combination of a CMR device and a mobile device. An embodiment can also be implemented as software instructions.

Furthermore, the illustrative embodiments may be implemented with respect to any type of data, data source, or access to a data source over a data network. Any type of data storage device may provide the data to an embodiment of the invention, either locally at a data processing system or over a data network, within the scope of the invention. Where an embodiment is described using a CMR device or mobile device, any type of data storage device suitable for use with the CMR device or mobile device may provide the data to such embodiment, either locally at the CMR device or mobile device or over a data network, within the scope of the illustrative embodiments.

The illustrative embodiments are described using specific code, designs, architectures, protocols, layouts, schematics, and tools only as examples and are not limiting to the illustrative embodiments. Furthermore, the illustrative embodiments are described in some instances using particular software, tools, and data processing environments only as an example for the clarity of the description. The illustrative embodiments may be used in conjunction with other comparable or similarly purposed structures, systems, applications, or architectures. For example, other comparable CMR devices, mobile devices, structures, systems, applications, or architectures therefor, may be used in conjunction with such embodiment of the invention within the scope of the invention. An illustrative embodiment may be implemented in hardware, software, or a combination thereof.

The examples in this disclosure are used only for the clarity of the description and are not limiting to the illustrative embodiments. Additional data, operations, actions, tasks, activities, and manipulations will be conceivable from this disclosure and the same are contemplated within the scope of the illustrative embodiments.

Any advantages listed herein are only examples and are not intended to be limiting to the illustrative embodiments. Additional or different advantages may be realized by specific illustrative embodiments. Furthermore, a particular illustrative embodiment may have some, all, or none of the advantages listed above.

Figure 2:
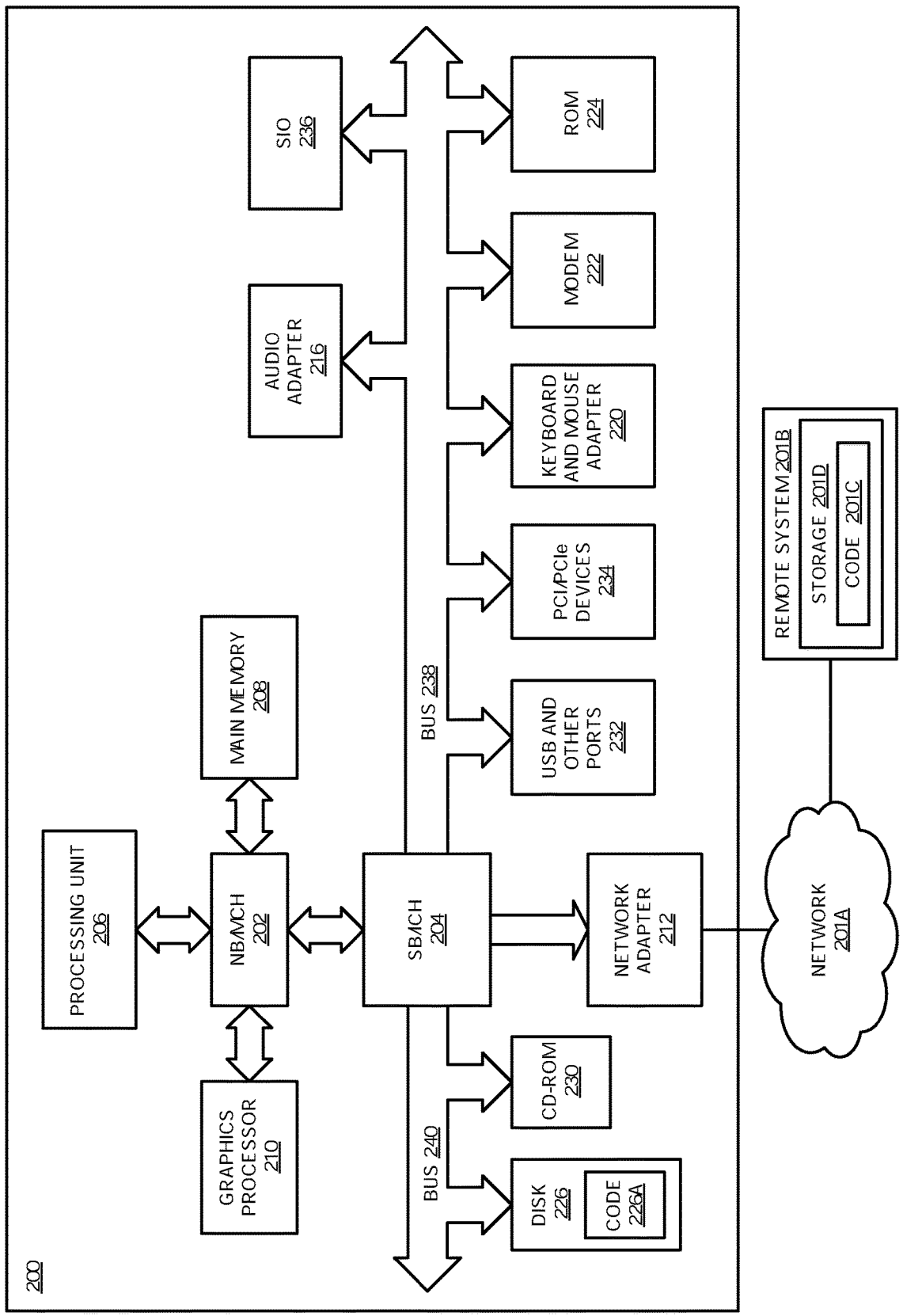
FIG. 2 depicts a block diagram of a data processing system in which illustrative embodiments may be implemented.

With reference to the figures and in particular with reference to FIGS. 1 and 2, these figures are example diagrams of data processing environments in which illustrative embodiments may be implemented. FIGS. 1 and 2 are only examples and are not intended to assert or imply any limitation with regard to the environments in which different embodiments may be implemented. A particular implementation may make many modifications to the depicted environments based on the following description.

FIG. 1 depicts a block diagram of a network of data processing systems in which illustrative embodiments may be implemented. Data processing environment 100 is a network of computers in which the illustrative embodiments may be implemented. Data processing environment 100 includes network 102. Network 102 is the medium used to provide communications links between various devices and computers connected together within data processing environment 100. Network 102 may include connections, such as wire, wireless communication links, or fiber optic cables.

Clients or servers are only example roles of certain data processing systems connected to network 102 and are not intended to exclude other configurations or roles for these data processing systems. Server 104 and server 106 couple to network 102 along with storage unit 108. Storage unit 108 contains database 109. Database 109 contains a repository of detected motion patterns and associated emotional responses. Software applications may execute on any computer in data processing environment 100. Clients 110, 112, and 114 are also coupled to network 102. A data processing system, such as server 104 or 106, or client 110, 112, or 114 may contain data and may have software applications or software tools executing thereon.

Only as an example, and without implying any limitation to such architecture, FIG. 1 depicts certain components that are usable in an example implementation of an embodiment. For example, servers 104 and 106, and clients 110, 112, 114, are depicted as servers and clients only as example and not to imply a limitation to a client-server architecture. As another example, an embodiment can be distributed across several data processing systems and a data network as shown, whereas another embodiment can be implemented on a single data processing system within the scope of the illustrative embodiments. Data processing systems 104, 106, 110, 112, and 114 also represent example nodes in a cluster, partitions, and other configurations suitable for implementing an embodiment.

Device 132 is an example of a device described herein. For example, device 132 can take the form of a mobile device, a gaming device, smartphone, a tablet computer, a laptop computer, client 110 in a stationary or a portable form, a wearable computing device, or any other suitable device that can be configured for requesting entity reviews and analysis reports. CMR device 138 can be either an independent CMR device or a dependent CMR device operating in conjunction with device 132, as described herein, such as over a wired or wireless data communication network. Sensor 140 implements an embodiment described herein to operate with CMR device 138, to perform an operation described herein, or both. Application 134 can be configured to use a sensor 140 or other component (not shown) of device 138 to perform an operation described herein.

Servers 104 and 106, storage unit 108, and clients 110, 112, and 114 may couple to network 102 using wired connections, wireless communication protocols, or other suitable data connectivity. Clients 110, 112, and 114 may be, for example, personal computers or network computers.

In the depicted example, server 104 may provide data, such as boot files, operating system images, and applications to clients 110, 112, and 114. Clients 110, 112, and 114 may be clients to server 104 in this example. Clients 110, 112, 114, or some combination thereof, may include their own data, boot files, operating system images, and applications. Data processing environment 100 may include additional servers, clients, and other devices that are not shown.

In the depicted example, data processing environment 100 may be the Internet. Network 102 may represent a collection of networks and gateways that use the Transmission Control Protocol/Internet Protocol (TCP/IP) and other protocols to communicate with one another. At the heart of the Internet is a backbone of data communication links between major nodes or host computers, including thousands of commercial, governmental, educational, and other computer systems that route data and messages. Of course, data processing environment 100 also may be implemented as a number of different types of networks, such as for example, an intranet, a local area network (LAN), or a wide area network (WAN). FIG. 1 is intended as an example, and not as an architectural limitation for the different illustrative embodiments.

Among other uses, data processing environment 100 may be used for implementing a client-server environment in which the illustrative embodiments may be implemented. A client-server environment enables software applications and data to be distributed across a network such that an application functions by using the interactivity between a client data processing system and a server data processing system. Data processing environment 100 may also employ a service oriented architecture where interoperable software components distributed across a network may be packaged together as coherent business applications. Data processing environment 100 may also take the form of a cloud, and employ a cloud computing model of service delivery for enabling convenient, on-demand network access to a shared pool of configurable computing resources (e.g. networks, network bandwidth, servers processing, memory, storage, applications, virtual machines, and services) that can be rapidly provisioned and released with minimal management effort or interaction with a provider of the service.

With reference to FIG. 2, this figure depicts a block diagram of a data processing system in which illustrative embodiments may be implemented. Data processing system 200 is an example of a computer, such as servers 104 and 106, or clients 110, 112, and 114 in FIG. 1, or another type of device in which computer usable program code or instructions implementing the processes may be located for the illustrative embodiments.

Data processing system 200 is also representative of a data processing system or a configuration therein, such as data processing system 132 or data processing system 138 in FIG. 1 in which computer usable program code or instructions implementing the processes of the illustrative embodiments may be located. Data processing system 200 is described as a computer only as an example, without being limited thereto. Implementations in the form of other devices, such as device 132 or device 138 in FIG. 1, may modify data processing system 200, modify data processing system 200, such as by adding a touch interface, and even eliminate certain depicted components from data processing system 200 without departing from the general description of the operations and functions of data processing system 200 described herein.

In the depicted example, data processing system 200 employs a hub architecture including North Bridge and memory controller hub (NB/MCH) 202 and South Bridge and input/output (I/O) controller hub (SB/ICH) 204. Processing unit 206, main memory 208, and graphics processor 210 are coupled to North Bridge and memory controller hub (NB/MCH) 202. Processing unit 206 may contain one or more processors and may be implemented using one or more heterogeneous processor systems. Processing unit 206 may be a multi-core processor. Graphics processor 210 may be coupled to NB/MCH 202 through an accelerated graphics port (AGP) in certain implementations.

In the depicted example, local area network (LAN) adapter 212 is coupled to South Bridge and I/O controller hub (SB/ICH) 204. Audio adapter 216, keyboard and mouse adapter 220, modem 222, read only memory (ROM) 224, universal serial bus (USB) and other ports 232, and PCI/PCIe devices 234 are coupled to South Bridge and I/O controller hub 204 through bus 238. Hard disk drive (HDD) or solid-state drive (SSD) 226 and CD-ROM 230 are coupled to South Bridge and I/O controller hub 204 through bus 240. PCI/PCIe devices 234 may include, for example, Ethernet adapters, add-in cards, and PC cards for notebook computers. PCI uses a card bus controller, while PCIe does not. ROM 224 may be, for example, a flash binary input/output system (BIOS). Hard disk drive 226 and CD-ROM 230 may use, for example, an integrated drive electronics (IDE), serial advanced technology attachment (SATA) interface, or variants such as external-SATA (eSATA) and micro-SATA (mSATA). A super I/O (SIO) device 236 may be coupled to South Bridge and I/O controller hub (SB/ICH) 204 through bus 238.

Memories, such as main memory 208, ROM 224, or flash memory (not shown), are some examples of computer usable storage devices. Hard disk drive or solid state drive 226, CD-ROM 230, and other similarly usable devices are some examples of computer usable storage devices including a computer usable storage medium.

An operating system runs on processing unit 206. The operating system coordinates and provides control of various components within data processing system 200 in FIG. 2. The operating system may be a commercially available operating system. An object oriented programming system may run in conjunction with the operating system and provide calls to the operating system from programs or applications executing on data processing system 200.

Instructions for the operating system, the object-oriented programming system, and applications or programs, such as application 134 in FIG. 1, are located on storage devices, such as in the form of code 226A on hard disk drive 226, and may be loaded into at least one of one or more memories, such as main memory 208, for execution by processing unit 206. The processes of the illustrative embodiments may be performed by processing unit 206 using computer implemented instructions, which may be located in a memory, such as, for example, main memory 208, read only memory 224, or in one or more peripheral devices.

Furthermore, in one case, code 226A may be downloaded over network 201A from remote system 201B, where similar code 201C is stored on a storage device 201D. In another case, code 226A may be downloaded over network 201A to remote system 201B, where downloaded code 201C is stored on a storage device 201D.

The hardware in FIGS. 1-2 may vary depending on the implementation. Other internal hardware or peripheral devices, such as flash memory, equivalent non-volatile memory, or optical disk drives and the like, may be used in addition to or in place of the hardware depicted in FIGS. 1-2. In addition, the processes of the illustrative embodiments may be applied to a multiprocessor data processing system.

In some illustrative examples, data processing system 200 may be a personal digital assistant (PDA), which is generally configured with flash memory to provide non-volatile memory for storing operating system files and/or user-generated data. A bus system may comprise one or more buses, such as a system bus, an I/O bus, and a PCI bus. Of course, the bus system may be implemented using any type of communications fabric or architecture that provides for a transfer of data between different components or devices attached to the fabric or architecture.

A communications unit may include one or more devices used to transmit and receive data, such as a modem or a network adapter. A memory may be, for example, main memory 208 or a cache, such as the cache found in North Bridge and memory controller hub 202. A processing unit may include one or more processors or CPUs.

The depicted examples in FIGS. 1-2 and above-described examples are not meant to imply architectural limitations. For example, data processing system 200 also may be a tablet computer, laptop computer, or telephone device in addition to taking the form of a mobile or wearable device.

Where a computer or data processing system is described as a virtual machine, a virtual device or a virtual component, the virtual machine, virtual device, or the virtual component operates in the manner of data processing system 200 using virtualized manifestation of some or all components depicted in data processing system 200. For example, in a virtual machine, virtual device, or virtual component, processing unit 206 is manifested as a virtualized instance of all or some number of hardware processing units 206 available in a host data processing system, main memory 208 is manifested as a virtualized instance of all or some portion of main memory 208 that may be available in the host data processing system, and disk 226 is manifested as a virtualized instance of all or some portion of disk 226 that may be available in the host data processing system. The host data processing system in such cases is represented by data processing system 200.

Figure 3:
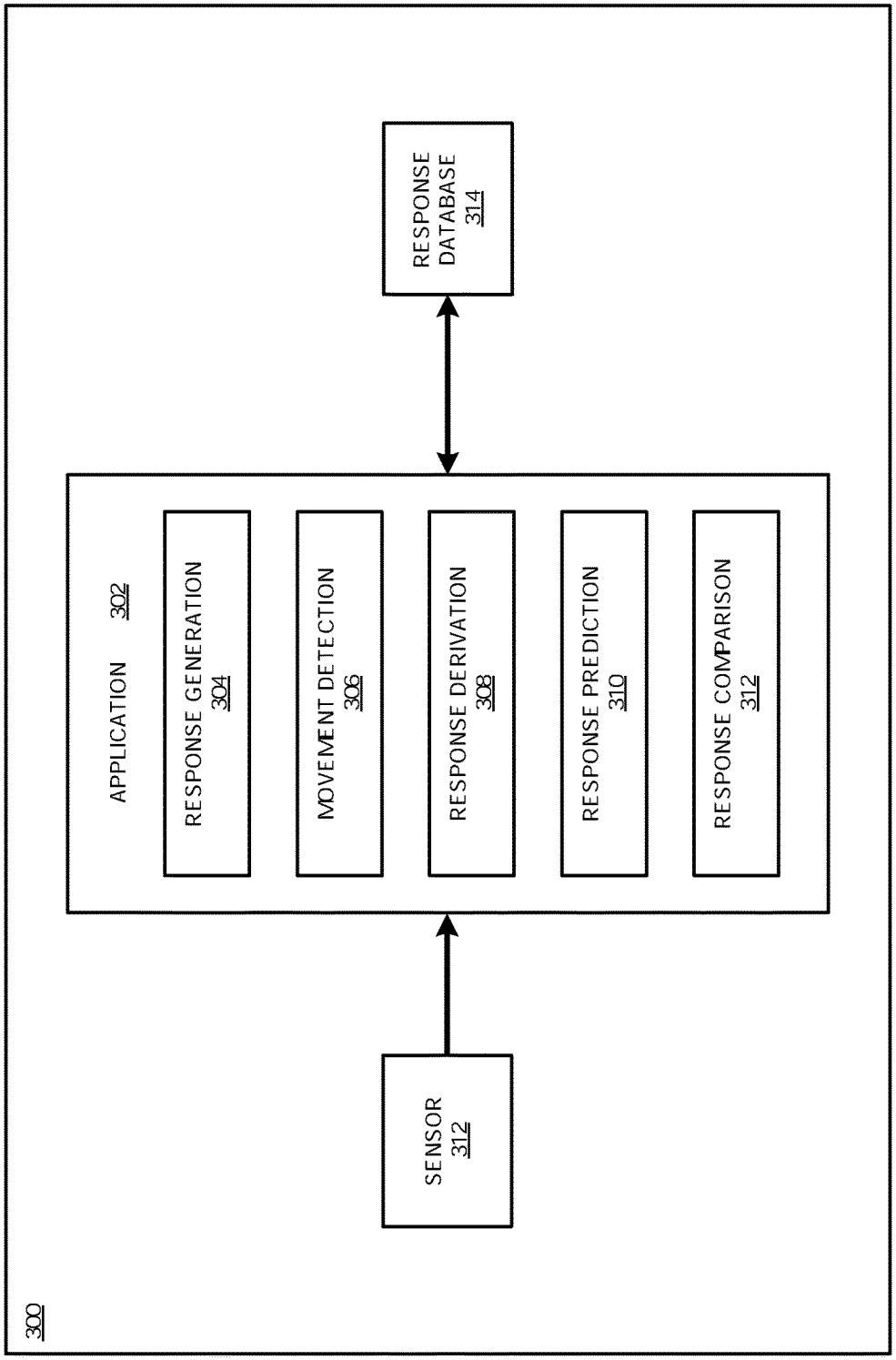
FIG. 3 depicts a block diagram of an example configuration for deriving avatar expressions in accordance with an illustrative embodiment.

With reference to FIG. 3, this figure depicts a block diagram of an example configuration 300 for motion pattern detection for response association in accordance with an illustrative embodiment. The example configuration includes an application 302. In a particular embodiment, application 302 is an example of application 134 of FIG. 1.

Application 302 includes a response generation component 304, a movement detection component 306, a response derivation component 308, a response prediction component 310, and a response comparison component 312. In a particular embodiment, response database 314 is an example of database 109. In the embodiment, response generation component 304 creates a session configured to provoke an emotional response sequence. The response generation component 304 receives an emotional response to provoke within a user. In an embodiment, the emotional response is an emotional state. For example, the emotional response can include emotional states such as boredom, fear, and happiness. In an embodiment, the emotional response sequence is a particular facial expression sequence. For example, the emotional response sequence can include an involuntary smile and an involuntary frown. An involuntary emotional response is a natural reaction to the session. A voluntary emotional response is an artificial reaction, such as, an actor producing a desired emotion.

Movement detection component 306 controls and manages sensors configured to detect facial movement. Movement detection component 306 detects motion patterns of the user. For example, component 306 can detect motion patterns from EMG sensors positioned at various locations on the user's face. Component 306 detects the motion patterns as the session occurs and associates the detected motion patterns with the provoked emotional response. Component 306 stores emotional responses, facial expressions, and facial muscle movement sequences in the response database 314. In an embodiment, component 306 analyzes the detected motion patterns to generate the motion patterns in an avatar. For example, component 306 can analyze the detected motion patterns using facial electromyography to capture movements of facial muscles. As another example, component 306 generates motion patterns on an avatar with virtual facial muscles corresponding to physical facial muscles of a user.

Response derivation component 308 derives a motion pattern corresponding to a new, previously undetected emotional response. Component 308 compares the motion patterns, muscle activation, and transitions between previously detected motion patterns in the database 314. For example, component 308 can compare the motion pattern, muscle activation level, and transition between a wide smile and a straight face to derive a motion pattern for a slight smile. Similarly, component 308 can determine how the facial muscles operate when transitioning from a smile to a laugh after detecting the transition from a smile to a frown. Component 308 records the derived motion pattern in the database 314. In an embodiment, response database 314 includes an emotional model for an avatar. For example, the emotional model can comprise a set of detected motion patterns, a set of derived motion patterns, associated facial expressions, and associated emotional responses. As another example, detected motion patterns and derived motion patterns of the emotional model can be created at an avatar by use of electromyography to generate virtual muscle activation levels in an avatar.

In an embodiment, component 308 derives a motion pattern using facial electromyography on an avatar. For example, component 308 can analyze motion patterns and muscle activation levels of an avatar performing a set of facial expressions using facial electromyography. In an embodiment, component 308 compares motion patterns and muscle activation levels between individual expressions of the set of facial expressions. For example, component 308 can compare the muscle activation level between a wide smile and a straight face. In an embodiment, component 308 determines differences between the individual expressions and derives a transition expression. For example, component 308 can determine that certain muscles decrease in activation level and other muscles increase in activation level.

Response comparison component 312 compares real facial movements to the derived facial movements. For example, a session can be created to provoke a previously undetected motion pattern corresponding to a previously unprovoked emotional response. Component 312 compares a derived motion pattern to a detected motion pattern for the same emotional response. Component 312 updates the derived motion pattern with aspects of the detected motion pattern. Component 312 stores the updated motion pattern in the database 314. In an embodiment, component 312 compares real motion patterns to the derived motion patterns. For example, component 312 can perform physical facial electromyography analysis on a detected motion pattern of a user to determine which facial muscles moved to produce the motion pattern. As another example, component 312 can perform virtual facial electromyography on an avatar to detect which virtual facial muscles moved. Component 312 compares the virtual EMG analysis and the physical EMG analysis to determine differences and similarities between the virtual motion pattern and physical motion pattern. Component 312 updates the derived motion pattern in the emotional model in database 314 in response to the analysis.

These motion patterns and emotional responses are only described as examples that can be detected, derived, generated, and compared with the application 302. Without departing from the scope of the illustrative embodiments, many different types of motion patterns and emotional responses can be similarly detected, derived, generated, and compared in conjunction with other embodiments.

Figure 4:
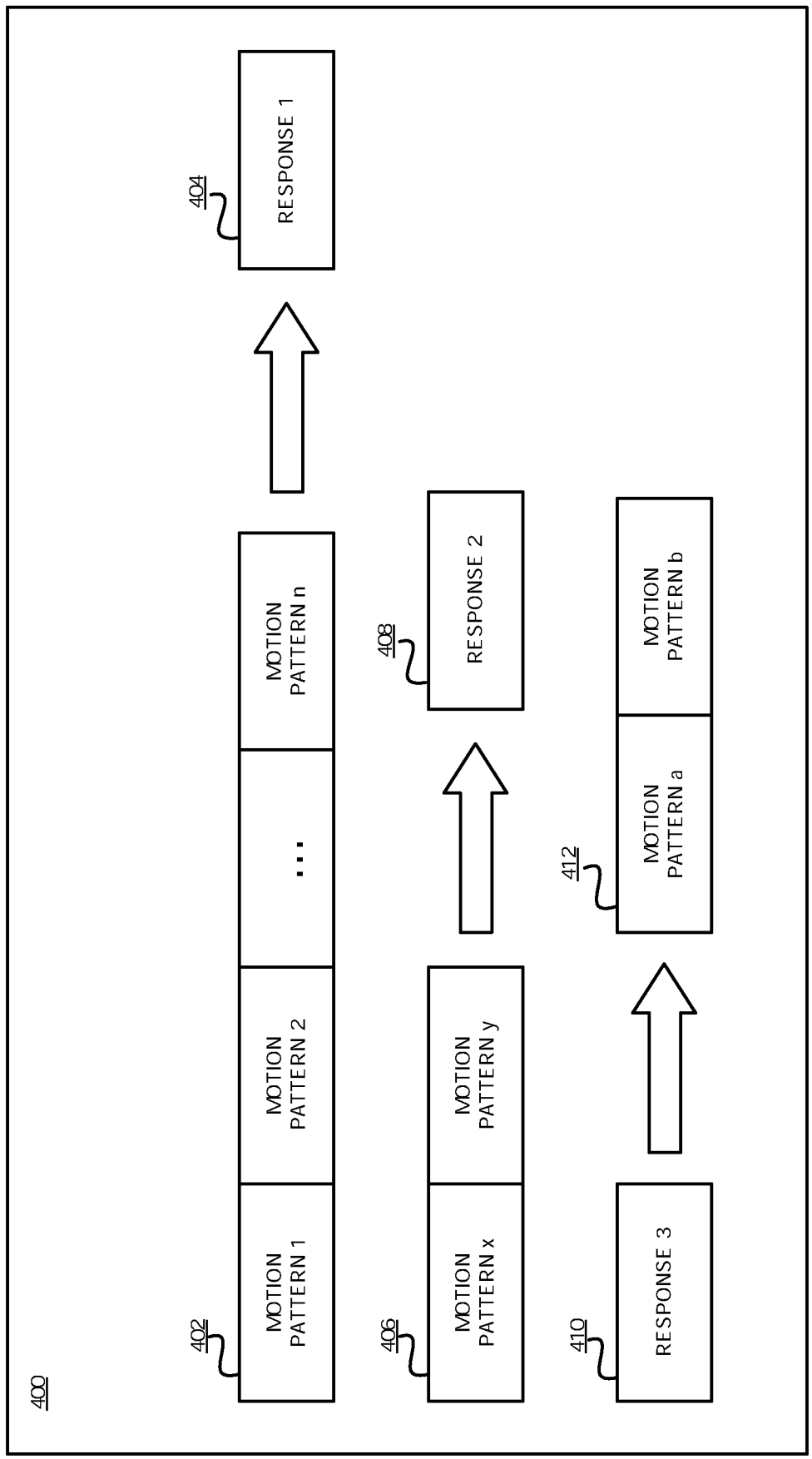
FIG. 4 depicts a block diagram of an example manner of deriving motion patterns in accordance with an illustrative embodiment.

With reference to FIG. 4, this figure depicts a block diagram of an example manner of deriving motion patterns in accordance with an illustrative embodiment.

Motion pattern 402 comprises any number and type of motion patterns. An application implementing an embodiment associates motion pattern 402 with response 404 labeled "response 1". Motion pattern 406 comprises any number and type of motion patterns. An application implementing an embodiment associates motion pattern 406 with response 408 labeled "response 2". The motion patterns in motion pattern 402, 406 may be unique motion pattern instances, repetitive motion patterns, singular or discrete motions, continuous motions, prolonged motions occurring over a period, or some combination thereof.

Response 410 comprises an unprovoked emotional response. In an embodiment, response 410 corresponds to an intermediate motion pattern between response 404 and response 408. An application implementing an embodiment derives motion pattern 412 from response 410. For example, motion pattern 412 may be derived from motion pattern 402 and motion pattern 406.

Figure 5:
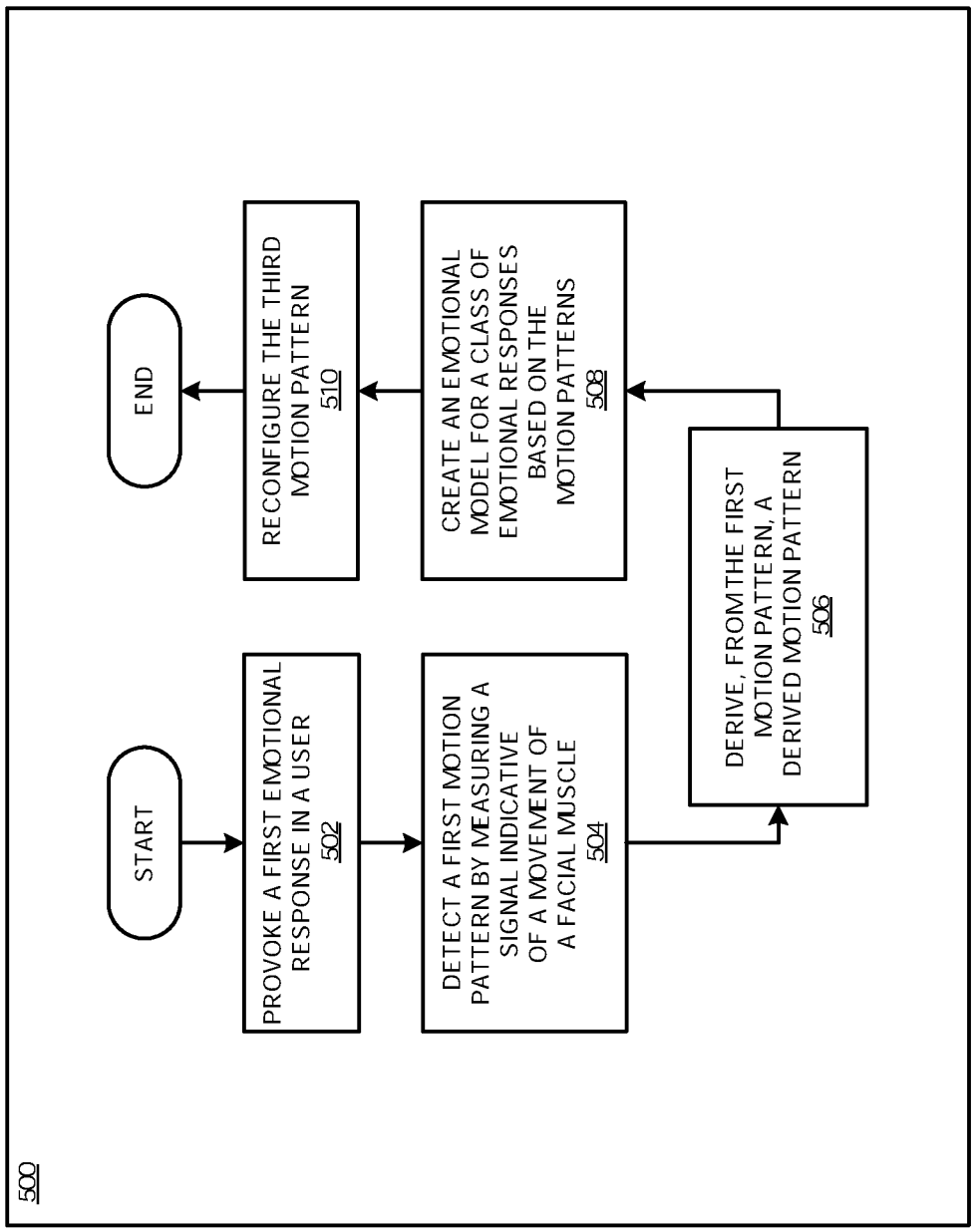
FIG. 5 depicts a flowchart of an example process for deriving avatar expressions in accordance with an illustrative embodiment.

With reference to FIG. 5, this figure depicts a flowchart of an example process for deriving avatar expressions in accordance with an illustrative embodiment. Process 500 can be implemented in application 134 in FIG. 1.

The application, using a CMR device, provokes a series of emotional responses in a user (block 502). The application detects, by measuring a signal indicative of a movement of a facial muscle, a first motion pattern (block 504). The application derives, from the first motion pattern, a derived motion pattern. In an embodiment, the first motion pattern and the derived motion pattern each correspond to different emotional responses of a class of emotional responses (block 506). The application creates an emotional model for the class of emotional responses based on the motion pattern and the derived motion pattern (block 508). The application reconfigures the derived motion pattern to a new motion pattern by (i) comparing the new motion pattern and the derived motion pattern and (ii) associating the new motion pattern with the class of emotional responses, wherein the derived motion pattern and the new motion pattern fail to be detected via muscle movement prior to detection of the motion pattern (block 510). The application ends process 500 thereafter, or returns to block 506 to derive another motion pattern.

Thus, a computer implemented method, system or apparatus, and computer program product are provided in the illustrative embodiments for dynamic device interaction reconfiguration. Where an embodiment or a portion thereof is described with respect to a type of device, the computer implemented method, system or apparatus, the computer program product, or a portion thereof, are adapted or configured for use with a suitable and comparable manifestation of that type of device.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

What is claimed is:

1. A computer-implemented method comprising:
   detecting, by measuring a signal indicative of a movement of a facial muscle, a detected motion pattern corresponding to a provoked emotional response;
   deriving, from the detected motion pattern and a second detected motion pattern, a derived motion pattern, the derived motion pattern corresponding to a new emotional response associated with a combination of the provoked emotional response and a second provoked emotional response corresponding to the second detected motion pattern;
   generating, in an avatar, a derived avatar motion pattern corresponding to the derived motion pattern, the derived avatar motion pattern comprising a generated virtual activation level of a virtual facial muscle of the avatar, the virtual facial muscle virtualizing the facial muscle; and
   adjusting, using an analysis of a comparison between the generated virtual activation level of the virtual facial muscle and an activation level of the facial muscle detected during a third detected motion pattern, the derived motion pattern, the activation level of the facial muscle determined using a second measurement of the signal, the adjusting comprising altering the virtual activation level, the third detected motion pattern detected responsive to a provoking of the new emotional response.

2. The method of claim 1, wherein the provoked emotional response comprises an emotional response provided by a user responsive to a prompt.

3. The method of claim 1, wherein detecting the detected motion pattern is performed at an application executing using a processor and a memory in a wearable device.

4. The method of claim 1, wherein the avatar comprises a set of virtual facial muscles virtualizing a set of physical facial muscles of a user, the set of virtual facial muscles comprising the virtual facial muscle.

5. The method of claim 1, wherein the derived motion pattern is derived from a transition between the detected motion pattern and the second detected motion pattern.

6. The method of claim 1, further comprising:
   generating, in the avatar, an avatar motion pattern corresponding to the detected motion pattern.

7. The method of claim 1, wherein the provoked emotion response comprises boredom.

8. A computer usable program product for deriving avatar expressions, the computer program product comprising:
   one or more computer readable storage media, and program instructions collectively stored on the one or more computer readable storage media, the program instructions comprising:
     program instructions to detect, by measuring a signal indicative of a movement of a facial muscle, a detected motion pattern corresponding to a provoked emotional response;
     program instructions to derive, from the detected motion pattern and a second detected motion pattern, a derived motion pattern, the derived motion pattern corresponding to a new emotional response associated with a combination of the provoked emotional response and a second provoked emotional response corresponding to the second detected motion pattern;
     program instructions to generate, in an avatar, a derived avatar motion pattern corresponding to the derived motion pattern, the derived avatar motion pattern comprising a generated virtual activation level of a virtual facial muscle of the avatar, the virtual facial muscle virtualizing the facial muscle; and
     program instructions to adjust, using an analysis of a comparison between the generated virtual activation level of the virtual facial muscle and an activation level of the facial muscle detected during a third detected motion pattern, the derived motion pattern, the activation level of the facial muscle determined using a second measurement of the signal, the adjusting comprising altering the virtual activation level, the third detected motion pattern detected responsive to a provoking of the new emotional response.

9. The computer usable program product of claim 8, wherein the provoked emotional response comprises an emotional response provided by a user responsive to a prompt.

10. The computer usable program product of claim 8, wherein detecting the detected motion pattern is performed at an application executing using a processor and a memory in a wearable device.

11. The computer usable program product of claim 8, further comprising:
    program instructions to generate, in the avatar, an avatar motion pattern corresponding to the detected motion pattern.

12. The computer usable program product of claim 8, wherein the avatar comprises a set of virtual facial muscles virtualizing a set of physical facial muscles of a user, the set of virtual facial muscles comprising the virtual facial muscle.

13. The computer usable program product of claim 8, wherein the derived motion pattern is derived from a transition between the detected motion pattern and the second detected motion pattern.

14. The computer usable program product of claim 8, wherein the stored program instructions are stored in the at least one of the one or more storage media of a local data processing system, and wherein the stored program instructions are transferred over a network from a remote data processing system.

15. The computer usable program product of claim 8, wherein the stored program instructions are stored in the at least one of the one or more storage media of a server data processing system, and wherein the stored program instructions are downloaded over a network to a remote data processing system for use in a computer readable storage device associated with the remote data processing system.

16. A computer system comprising one or more processors, one or more computer-readable memories, and one or more computer-readable storage devices, and program instructions stored on at least one of the one or more storage devices for execution by at least one of the one or more processors via at least one of the one or more memories, the stored program instructions comprising:
    program instructions to detect, by measuring a signal indicative of a movement of a facial muscle, a detected motion pattern corresponding to a provoked emotional response;
    program instructions to derive, from the detected motion pattern and a second detected motion pattern, a derived motion pattern, the derived motion pattern corresponding to a new emotional response associated with a combination of the provoked emotional response and a second provoked emotional response corresponding to the second detected motion pattern;
    program instructions to generate, in an avatar, a derived avatar motion pattern corresponding to the derived motion pattern, the derived avatar motion pattern comprising a generated virtual activation level of a virtual facial muscle of the avatar, the virtual facial muscle virtualizing the facial muscle; and program instructions to adjust, using an analysis of a comparison between the generated virtual activation level of the virtual facial muscle and an activation level of the facial muscle detected during a third detected motion pattern, the derived motion pattern, the activation level of the facial muscle determined using a second measurement of the signal, the adjusting comprising altering the virtual activation level, the third detected motion pattern detected responsive to a provoking of the new emotional response.

17. The computer system of claim 16, wherein the provoked emotional response comprises an emotional response provided by a user responsive to a prompt.

18. The computer system of claim 16, wherein detecting the detected motion pattern is performed at an application executing using a processor and a memory in a wearable device.

\* \* \* \* \*